United States Patent
Kim et al.

(10) Patent No.: US 7,038,728 B2
(45) Date of Patent: May 2, 2006

(54) IMAGE DISPLAY METHOD AND APPARATUS

(75) Inventors: Ick Hwan Kim, Kyungsangbuk-do (KR); In Hoon Kim, Daegu (KR)

(73) Assignee: LG Electronics Inc., Seoul (KR)

( * ) Notice: Subject to any disclaimer, the term of this patent is extended or adjusted under 35 U.S.C. 154(b) by 483 days.

(21) Appl. No.: 10/158,194

(22) Filed: May 31, 2002

(65) Prior Publication Data

US 2002/0180887 A1   Dec. 5, 2002

(30) Foreign Application Priority Data

Jun. 1, 2001   (KR) .............................. 2001-30838

(51) Int. Cl.
*H04N 11/20* (2006.01)

(52) U.S. Cl. .................................... 348/445

(58) Field of Classification Search ............... 348/445, 348/441, 458, 456, 913, 459
See application file for complete search history.

(56) References Cited

U.S. PATENT DOCUMENTS

| | | | | |
|---|---|---|---|---|
| 5,070,395 A | * | 12/1991 | Kitaura et al. | 348/445 |
| 5,243,421 A | * | 9/1993 | Nagata et al. | 348/445 |
| 5,444,492 A | * | 8/1995 | Kihara | 348/445 |
| 5,638,130 A | * | 6/1997 | Linzer | 348/445 |
| 5,949,494 A | * | 9/1999 | Yamagata et al. | 348/558 |
| 5,973,749 A | * | 10/1999 | Ishii et al. | 348/558 |
| 6,333,761 B1 | * | 12/2001 | Yasuda | 348/333.12 |
| 6,487,248 B1 | * | 11/2002 | Lim et al. | 375/240.12 |
| 6,606,423 B1 | * | 8/2003 | Cho | 382/300 |
| 6,788,347 B1 | * | 9/2004 | Kim et al. | 348/441 |
| 2003/0189669 A1 | * | 10/2003 | Bowser | 348/564 |

* cited by examiner

*Primary Examiner*—Paulos M. Natnael
(74) *Attorney, Agent, or Firm*—Fleshner & Kim, LLP

(57) ABSTRACT

Disclosed is an image display method and apparatus capable of displaying best quality images even when image signals with a variety of aspect ratios are inputted. The image display method includes restoring a picture frame from a video data stream, detecting an aspect ratio of the picture frame, checking if the aspect ratio of the picture frame is matched with a predetermined aspect ratio of a digital TV receiver, adjusting a vertical size or a horizontal size of the picture frame if the aspect ratio of the picture frame and the predetermined aspect ratio of the digital TV receiver are different from each other, and format-converting the picture frame having the adjusted vertical size or horizontal size in accordance with a selected output format to output the format-converted the picture frame.

7 Claims, 4 Drawing Sheets

4:3 FORMAT                          STANDARD TV

4:3 FORMAT                          WIDE TV

4:3 FORMAT     WIDE TV

16:9 FORMAT     WIDE TV

16:9 FORMAT     STANDARD TV

4:3 FORMAT     STANDARD TV

IMAGE DISPLAY METHOD AND APPARATUS

BACKGROUND OF THE INVENTION

1. Field of the Invention

The present invention relates to a digital television receiver. In particular, the present invention relates to an image display method and apparatus.

2. Description of the Related Art

Recently, a consumer demand has been increasing for wide television (TV) receivers that can process greater than 480P (Progressive) input signal. The trend is expected to continue since future TV broadcasting programs will have an aspect ratio of 16:9.

Nevertheless, a most widely used standard TV receiver has an effective picture of 4:3 (or, 480I (Interlace)). Therefore, if an image signal of greater than 480P or a HD (High Definition) image signal of 720P or 1080I is received from the outside, the TV receiver judges that the image signal of a wide format is inputted, and adjusts the image signal to correspond to the effective picture size of the standard TV receiver to display the image signal.

A conventional image display method for a digital TV receiver as described above will be explained with reference to FIGS. 1A and 1B. According to the method, a user first designates a kind of the TV receiver. That is, the user stores in advance identification data on the kind of the receiver whether the corresponding TV receiver belongs to the standard TV receiver or the wide TV receiver.

In this state, if the image signal is inputted from the outside, the TV receiver retrieves the kind of the subject TV receiver, and if the inputted image signal from the outside is a 4:3 formatted image signal as illustrated in FIG. 1A, the TV receiver displays the image signal as it is. In contrast, if the TV receiver belongs to the wide TV receiver, and the image signal inputted from the outside is a 4:3 formatted image signal as shown in FIG. 1B, the TV receiver expands the image signal to correspond to the effective picture size of the wide TV receiver to display the image signal.

As aforementioned, if the broadcasting signal of the standard TV is received, the conventional wide TV receiver simply expands the aspect ratio of the image signal to display the image signal. Expanding the aspect ratio of the image signal to correspond to the effective picture size of the TV receiver may cause distortion of the output image.

SUMMARY OF THE INVENTION

It is, therefore, an object of the present invention to provide an image display method and apparatus for a digital TV receiver, which can display the output image without distortion by adjusting an aspect ratio of an image signal inputted from the outside to correspond to the aspect ratio of the TV receiver.

To achieve the above object, there is provided an image display method, which includes the steps of restoring a picture frame from a video data stream; detecting an aspect ratio of the picture frame; checking if the aspect ratio of the picture frame is identical with a predetermined aspect ratio of a digital television (TV) receiver; adjusting a vertical size or a horizontal size of the picture frame if the aspect ratio of the picture frame and the predetermined aspect ratio of the digital TV receiver are different from each other; and format-converting the picture frame having the adjusted vertical size or horizontal size in accordance with a selected output format to output the format converted picture frame.

In another aspect of the present invention, there is provided an image display apparatus, which includes a video decoder for restoring a picture frame from a video data stream; a decimator for adjusting a horizontal size or a vertical size of the picture frame and outputting the adjusted picture frame; a microprocessor for detecting an aspect ratio of the picture frame, and controlling the decimator to adjust the horizontal size or the vertical size of the picture frame if it is detected that the detected aspect ratio detected is different from a predetermined aspect ratio; and a format converter for format-converting the picture frame having the adjusted horizontal size or vertical size outputted from the decimator in accordance with a selected output format and outputting the format-adjusted picture frame.

BRIEF DESCRIPTION OF THE DRAWINGS

The above object, other features and advantages of the present invention will become more apparent from the following detailed description when taken in conjunction with the accompanying drawings, in which.

DETAILED DESCRIPTION OF THE PREFERRED EMBODIMENT

Figure 1A:
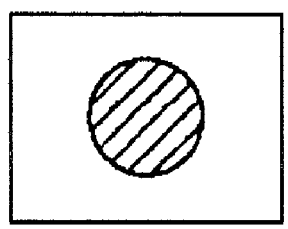
FIGS. 1A and 1B are views illustrating images displayed in a conventional manner.
Figure 1A:
Figure 1A:
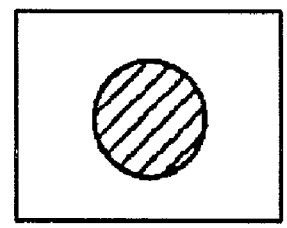
Figure 1B:
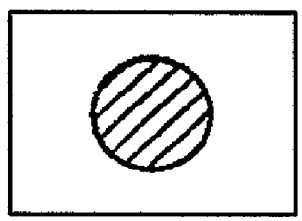
Figure 1B:
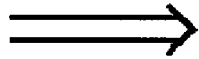
Figure 1B:
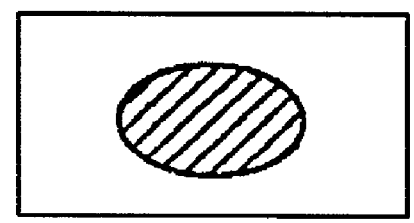

A preferred embodiment of the present invention will now be described with reference to the accompanying drawings. In the following description, same drawing reference numerals are used for the same elements even in different drawings. The matters defined in the description are nothing but the ones provided to assist in a comprehensive understanding of the invention. Thus, it is apparent that the present invention can be carried out without those defined matters. Also, well-known functions or constructions are not described in detail since they would obscure the invention in unnecessary detail.

The present invention enables a TV receiver to display an output image without distortion by compressing an aspect ratio of the input image signal in a horizontal or vertical direction in accordance with the aspect ratio of the TV receiver, and then rearranging the compressed image signal. The horizontal compression is accomplished by reducing vertical scanning lines of the image signal to a predetermined ratio, and similarly, the vertical compression is accomplished by reducing horizontal scanning lines of the image signal to a predetermined ratio.

An image display apparatus in accordance with a preferred embodiment of the present invention will now be explained with reference to FIG. 2.

Figure 2:
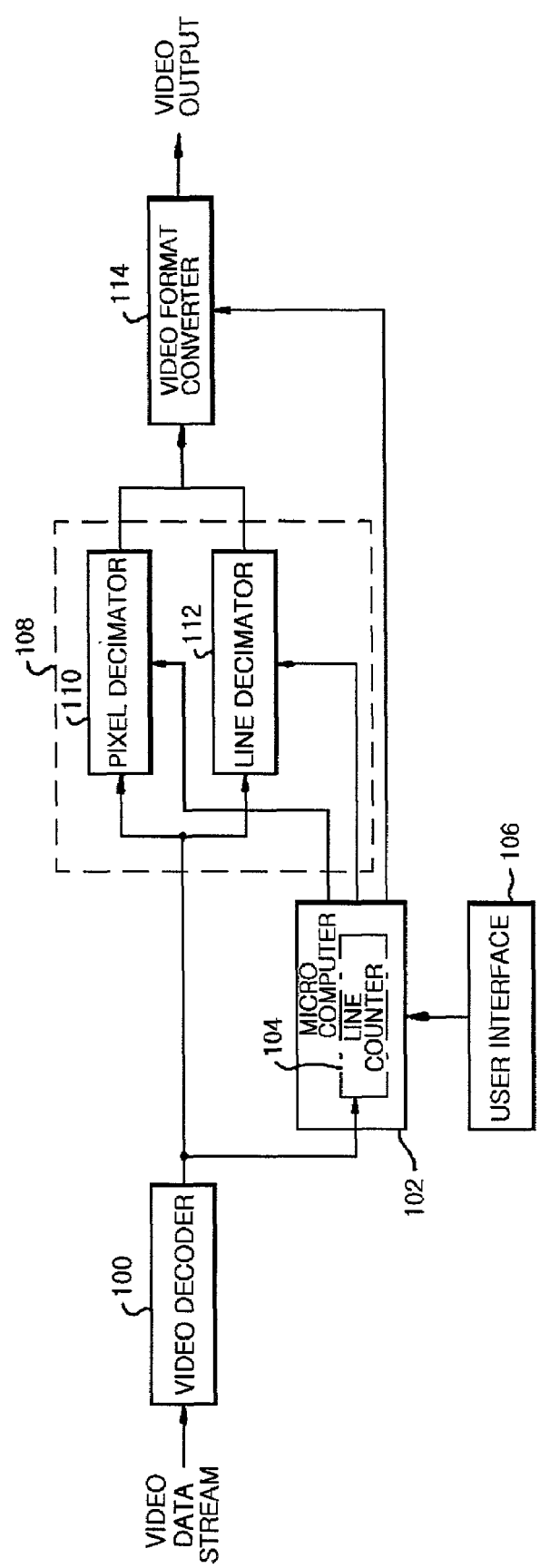
FIG. 2 is a view illustrating the construction of a digital TV receiver incorporating the present invention.

As shown in FIG. 2, a video decoder 100 decodes an inputted video data stream, to a picture frame, and provides the picture frame to a decimator 108 and a microprocessor 102. The microprocessor 102 detects the number of lines of the picture frame and extracts the aspect ratio of the picture. In general, the number of lines is sufficient to extract information on the aspect ratio because the aspect ratio is usually standardized. The microprocessor 102 compares the aspect ratio of a digital TV receiver predetermined by a user with the aspect ratio of the picture, and commands the decimator 108 to compress the horizontal size or the vertical size according to difference between the two aspect ratios. Further, the microprocessor 102 includes a line counter 104 for counting the number of lines on the picture frame to detect the aspect ratio of the picture. And, a user interface 106 interfaces between the user and the microprocessor 102.

The decimator 108 includes a pixel decimator 110 and a line decimator 112. The pixel decimator 110 eliminates a part of pixels in each line of the picture frame under the command of the microprocessor 102, thereby reducing the number of the vertical scanning lines, which consequently compresses the horizontal size of the picture frame. Here, the number of pixels to be eliminated is determined by the compression rate based on the aspect ratio. On the other hand, the line decimator 112 eliminates a part of the pixels in each line of the picture frame under the command of the microprocessor 102, thereby reducing the number of the horizontal scanning lines, which consequently compresses the vertical size of the picture frame. Again, the number of the pixels to be eliminated is determined by the compression rate based on the aspect ratio. Under the control of the microprocessor 102, a video format converter 114 format-converts the picture frame outputted from the decimator 108 into the predetermined output formats, that is, 480$i$, 480$p$, 720$p$, 1040$i$, etc., and outputs the format-converted picture frame.

Figure 3:
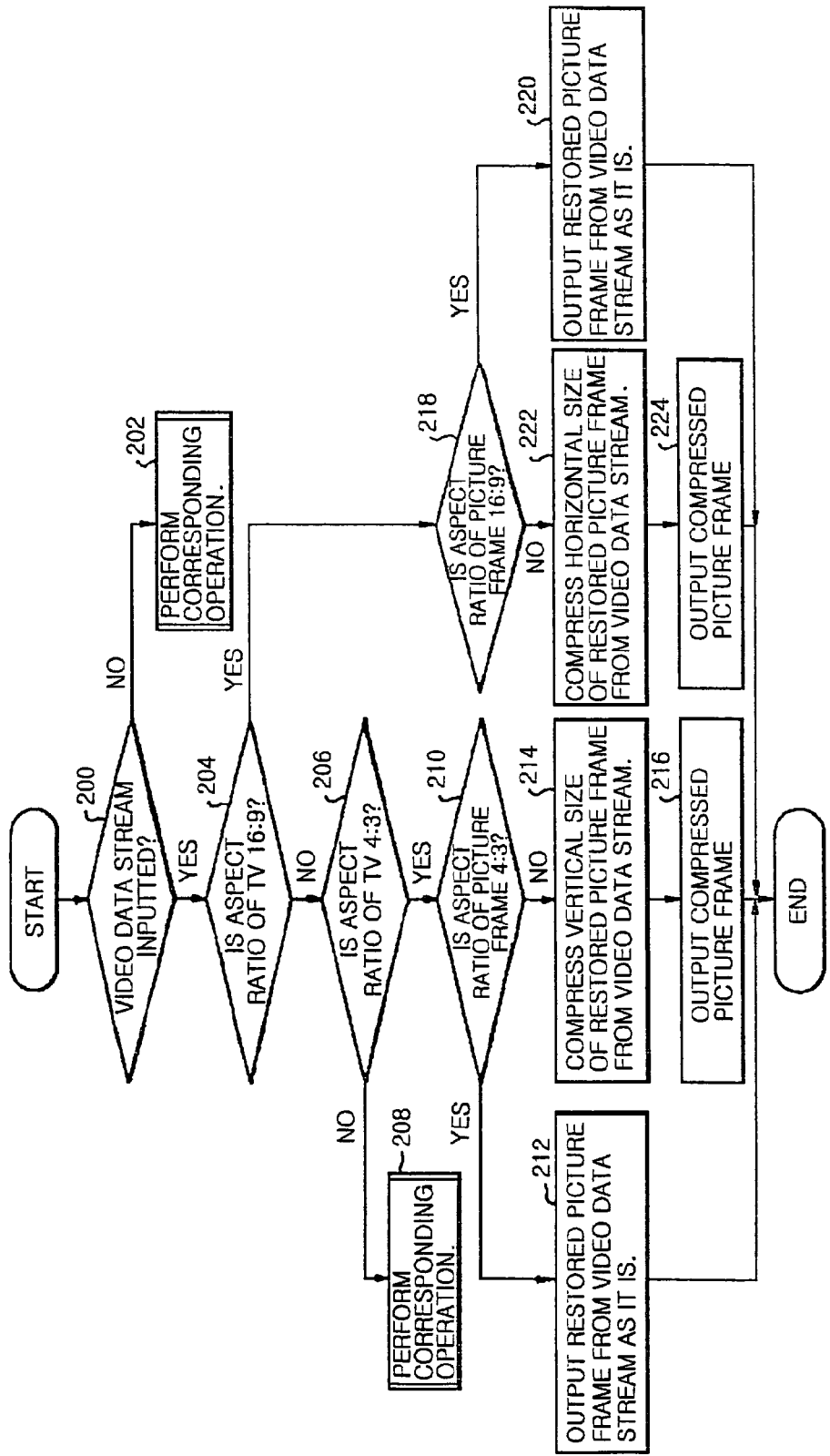
FIG. 3 is a flowchart illustrating an image display method according to a preferred embodiment of the present invention.
Figure 4A:
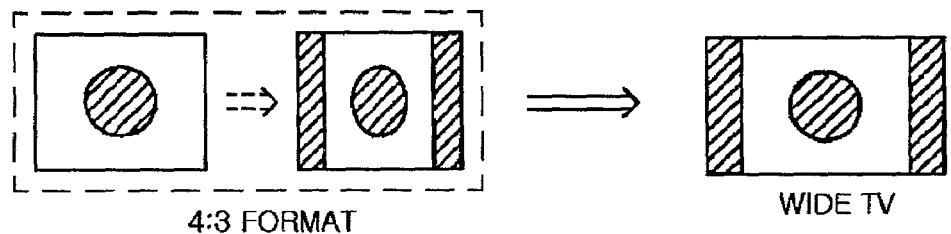
FIGS. 4A through 4D are views illustrating images displayed in accordance with a preferred embodiment of the present invention.
Figure 4B:
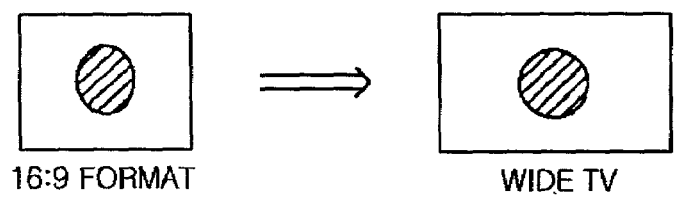

The image display method according to the present invention will now be explained with reference to FIG. 3. The microprocessor 102 first receives a video data stream from the outside (step S200), and the user checks whether or not the predetermined aspect ratio is 16:9 using the user interface 106 (step S204). If the predetermined aspect ratio turns out to be 16:9, the microprocessor 102 checks whether the aspect ratio of the restored picture from the inputted video data stream is 16:9 (step S218). In case that the aspect ratio designated by the user and the picture's aspect ratio are both 16:9, the microprocessor 102 provides the restored picture frame from the inputted video data stream to the video format converter 114. Then, the video format converter 114 format-converts the inputted picture frame into the selected output format, and outputs the picture frame (step S220). As illustrated in FIG. 4B, the restored picture frame from the video data stream is outputted.

On the contrary, if the aspect ratio of the restored picture frame from the inputted video data stream is 4:3, not 16:9, the microprocessor 102 commands the pixel decimator 110 to compress the horizontal size of the restored picture frame from the inputted video data stream (step S222). Under the command, the pixel decimator 110 compresses the horizontal size of the picture frame by eliminating the part of the pixels included in each line of the picture frame, and the horizontally compressed picture frame is provided to the video format converter 114. Then the video format converter 114 format-converts the horizontally compressed picture frame into the selected output format, and finally outputs the format-converted picture frame (step S224). That is, as shown in FIG. 4A, the restored picture frame from the video data stream is outputted after being compressed horizontally.

Figure 4C:
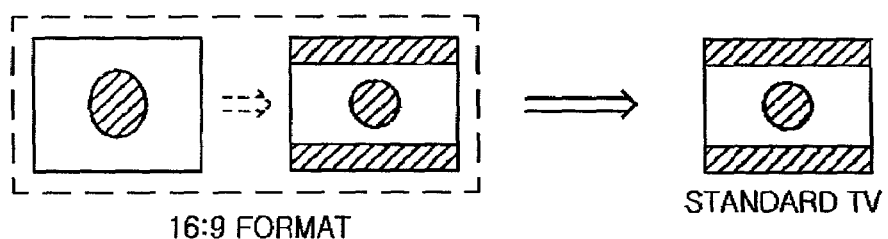
Figure 4D:
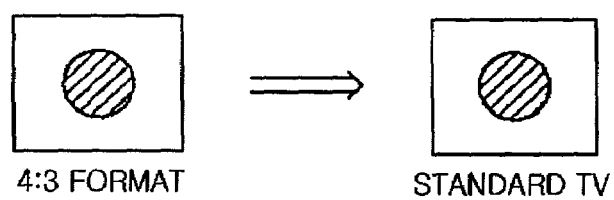

As another case, if the predetermined aspect ratio by the user through the user interface 106 is 4:3 instead of 16:9 (steps S204 and S206), the microprocessor 102 checks if the aspect ratio of the restored picture frame from the inputted video data stream is also 4:3 (step S210). If it turns out that the aspect ratio designated by the user and the aspect ratio of the picture are both 4:3, the microprocessor 102 provides the restored picture frame from the inputted video data stream to the video format converter 114 as it is. At the end, the video format converter 114 format-converts the inputted picture frame into the selected output format, and outputs the picture frame (step S212). In other words, the restored picture frame from the inputted video data stream is outputted as it is, as illustrated in FIG. 4D.

In contrast, if the aspect ratio of the restored picture frame from the inputted video data stream is 16:9, not 4:3, the microprocessor 102 commands the line decimator 112 to compress the vertical size of the restored picture frame from the inputted video data stream (S214). Under the command, the line decimator 112 compresses the vertical size of the picture frame by eliminating the part of lines in the picture frame. The vertically compressed picture frame is then provided to the video format converter 114. Later, the video format converter 114 format-converts the vertically compressed picture frame into the selected output format, and outputs the format-converted picture frame (S216). As manifested in FIG. 4C, the restored picture frame from the video data stream is outputted after being compressed vertically.

As described above, the image display method and apparatus according to the present invention enables the digital TV receiver to properly adjust the aspect ratio of the image signal inputted from the outside if the subject aspect ratio is not matched with the predetermined aspect ratio of the TV receiver and thus displays the best quality images.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. An image display method for a digital television (TV) receiver, comprising:
   restoring a picture frame from a video data stream;
   detecting an aspect ratio of the picture frame;
   checking if the aspect ratio of the picture frame is matched with a predetermined aspect ratio of the digital TV receiver;
   adjusting a vertical size or a horizontal size of the picture frame if the aspect ratio of the picture frame and the predetermined aspect ratio of the digital TV receiver are different from each other comprising if the aspect ratio of the picture frame is greater than the predetermined aspect ratio of the digital TV receiver, compressing a vertical size of the picture frame, and if the aspect ratio of the picture frame is less than the predetermined aspect ratio of the digital TV receiver, compressing a horizontal size of the picture frame; and
   format-converting the picture frame having the adjusted vertical size or horizontal size in accordance with a selected output format to output the format-converted picture frame.

2. The method of claim 1, wherein at the adjusting step, if the aspect ratio of the digital TV receiver is 16:9 and the aspect ratio of the picture frame is 4:3, a horizontally compressed picture frame is output.

3. The method of claim 1, wherein at the adjusting step, if the aspect ratio of the digital TV receiver is 4:3, and the aspect ratio of the picture frame is 16:9, a vertically compressed picture frame is output.

4. The method of claim 3, wherein the vertical compression of the picture frame is accomplished by eliminating a part of lines constituting the picture frame.

5. The method of claim 3, wherein the horizontal compression of the picture frame is accomplished by eliminating a part of pixels of lines constituting the picture frame.

6. An image display apparatus for a digital television (TV) receiver, comprising:
   a video decoder configured to restore a picture frame from a video data stream;
   a decimator configured to adjust a horizontal size or a vertical size of the picture frame and output the adjusted picture frame;
   a microprocessor configured to detect an aspect ratio of the picture frame and control the decimator to adjust the horizontal size or the vertical size of the picture frame if it is detected that the detected aspect ratio is different from a predetermined aspect ratio; and
   a format converter configured to format-convert the picture frame having the adjusted horizontal size or vertical size output from the decimator in accordance with a selected output format and output the format-adjusted picture frame, wherein the decimator comprises:
   a pixel decimator configured to adjust the horizontal size of the picture frame under the control of the microprocessor; and
   a line decimator configured to adjust the vertical size of the picture frame under the control of the microprocessor.

7. The apparatus of claim 6, wherein the microprocessor specifically commands the pixel decimator to compress the horizontal size of the picture frame if the aspect ratio of the digital TV receiver is 16:9 and the aspect ratio of the picture frame is 4:3, while it commands the line decimator to compress the vertical size of the picture frame if the aspect ratio of the digital TV receiver is 4:3 and the aspect ratio of the picture frame is 16:9.

* * * * *